June 8, 1943.   E. C. CROWTHER   2,321,466
LOCKING NUT STRUCTURE
Filed Oct. 10, 1940   2 Sheets-Sheet 1

INVENTOR.
Edmond C. Crowther
BY Cox Moore & Olson
attys

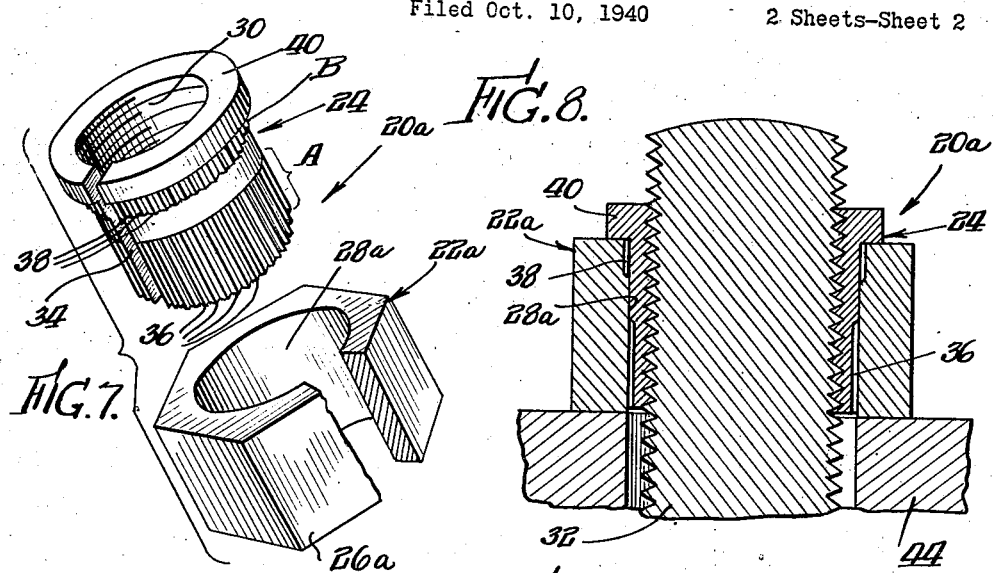
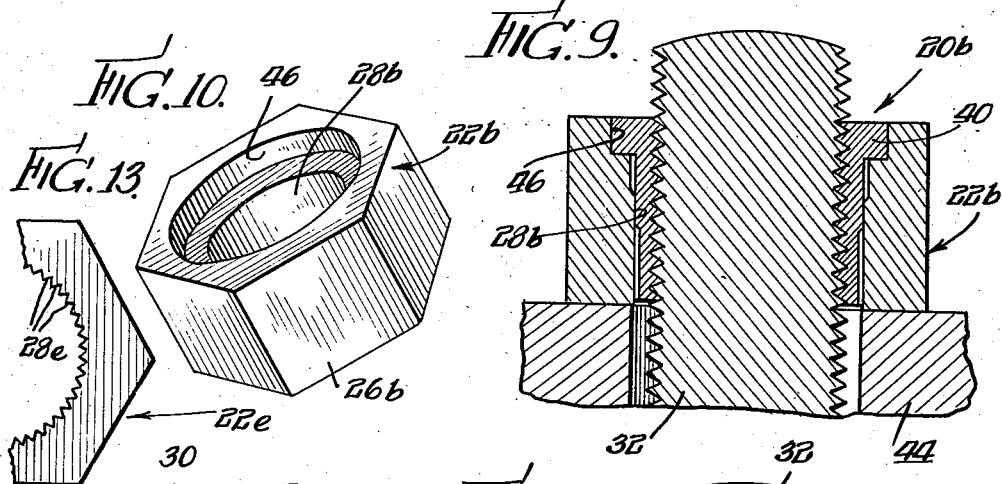
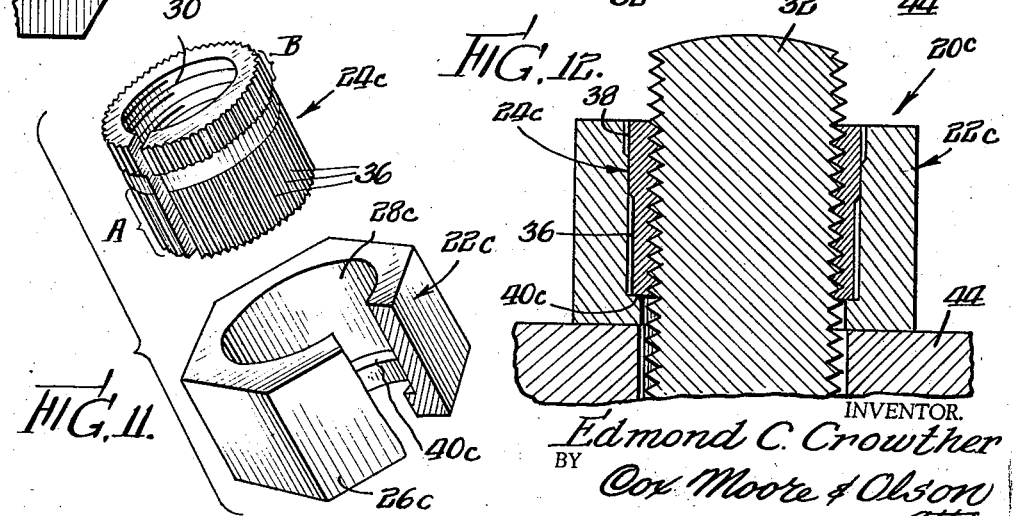

Patented June 8, 1943

2,321,466

UNITED STATES PATENT OFFICE 2,321,466

LOCKING NUT STRUCTURE

Edmond C. Crowther, Philadelphia, Pa.

Application October 10, 1940, Serial No. 360,616

14 Claims. (Cl. 151—19)

This invention relates generally to locking nuts and particularly to locking nuts which are designed to grip the thread on a bolt shank or screw when the nut is clamped against a work surface.

I am familiar with a number of locking nuts which have heretofore been in commercial use. Certain of these prior devices present difficulties and disadvantages which the present invention proposes to overcome. For example, certain locking devices which have heretofore been employed cannot be quickly spun on to a screw shank during the initial application of the nut to the screw due to the tight fit which occurs before the device reaches the work surface. Others are affected by changes in temperature and moisture conditions due to the use of different materials such as fibre and are not capable of being used over and over again without experiencing a substantial decrease in locking efficiency. It is, therefore, one of the important objects of the present invention to provide a locking nut which is free from the above mentioned and other deficiencies and to this end my invention contemplates a device or nut structure which may be initially spun upon a screw shank with no abnormal frictional resistance, and immediately upon the engagement of the clamping surface with the work and as an incident to said engagement, the thread convolutions of the screw will be impinged by the thread convolutions of the nut structure so as to effectively secure the device against inadvertent loosening and to retain such locking properties even though the clamping pressure of the nut structure against the work surface may subsequently be relieved.

It is a further object of the present invention to provide a locking device or nut as set forth above wherein the portion which impinges the thread convolutions of the screw is made of a substance such as metal, the locking effectiveness of which will not be affected by variations in temperature, moisture conditions, et cetera.

More specifically, my invention contemplates a two-part nut structure which may be handled as a single unit, as distinguished from the customary use of a nut and lock washer.

It is a further object of the present invention to provide a locking nut structure as referred to above which will continue to lockingly impinge the screw periphery even though the screw or bolt may experience stretching or the work experience movement away from the clamping surface of the nut.

It is an important object of the present invention to provide a two-part nut structure in which means is employed between the complementary surfaces of these parts to provide for thread tolerances in the screw and nut, and manufacturing tolerances between the two parts of the nut structure without impairing the locking effectiveness of the device. To this end I propose to employ knurled or roughened surfaces for driving the peripheral surface of one part into locking engagement with the complementary peripheral surface of the other part.

It is another object of the present invention to provide a locking nut of the type specified above which may be used over and over again without destroying its locking effectiveness and which may be readily disassembled from the screw.

This invention also contemplates a locking nut structure which may be very economically produced and which will enable the use of various kinds of material such as steel, brass, bronze, aluminum, stainless steel, et cetera.

It is a further object of the present invention to provide a lock nut which after being locked upon the thread of a screw element may be removed therefrom by a wrench or other means without causing injury to the thread of either the screw or the nut.

The foregoing and other objects and advantages will be more apparent from the following detailed description when considered in connection with the accompanying drawings, wherein.

Figure 1:
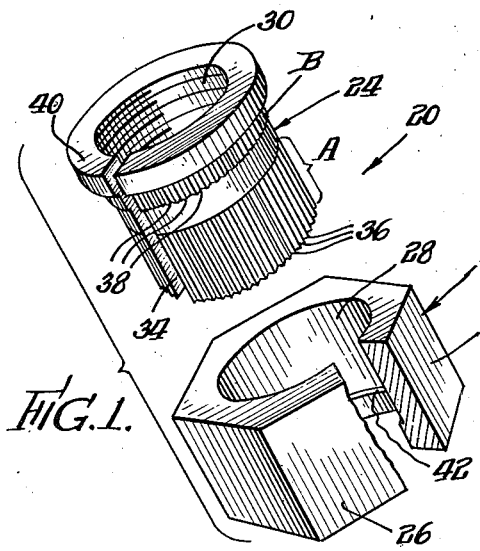
Figure 1 is a perspective view of the two parts forming my improved lock nut structure, said parts being separated so as to more clearly illustrate the structural arrangement thereof, and the shell portion being broken away to more clearly illustrate the structural arrangement of the inner periphery thereof.
Figure 3:
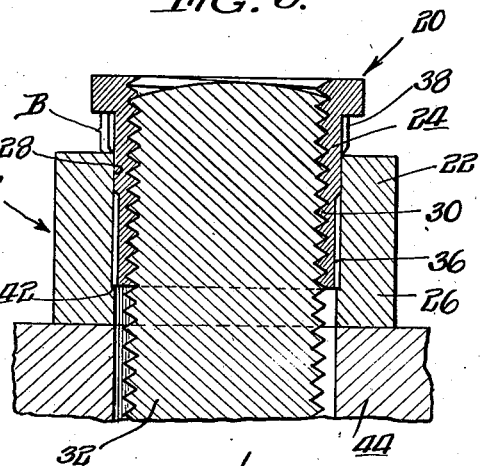
Figure 2:
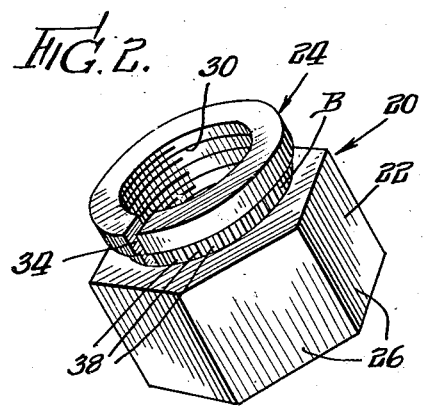
Figure 2 is a perspective view similar to Figure 1, disclosing the parts in their preliminary assembled relation prior to the application of said parts to a screw shank.
Figure 4:
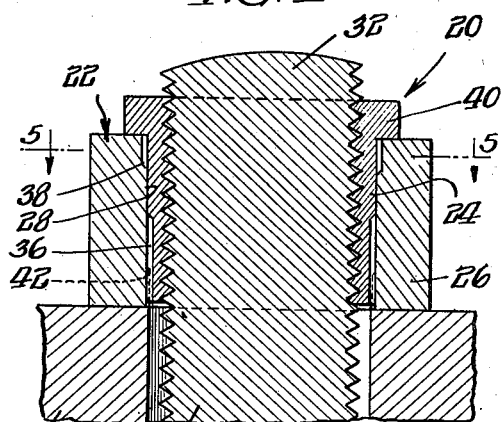
Figure 5:
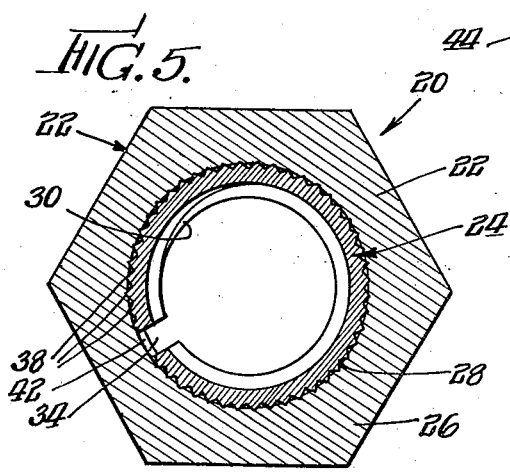
Figure 6:
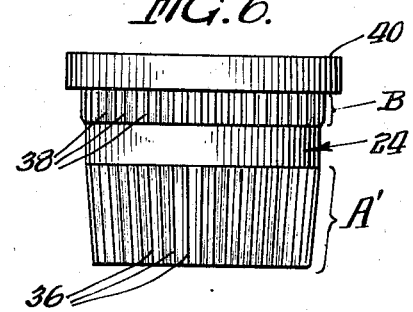

Figure 3 discloses the locking nut structure of Figure 2 initially applied to a screw shank and just prior to the final tightening or clamping of the shell structure against the work surface;

Figure 4 is a view similar to Figure 3, disclosing the relative positions occupied by the shell and threaded insert after the shell has been finally clamped against the work surface;

Figure 5 is a transverse sectional view taken substantially along the line 5—5 of Figure 4;

Figure 6 is a side elevational view of a threaded insert of slightly modified form wherein the entering end thereof is slightly tapered to facilitate initial insertion within the shell;

Figure 7 is a view similar to Figure 1, disclosing a slightly modified locking nut structure wherein the shell is provided with a uniform internal diameter as distinguished from the stepped arrangement shown in Figure 1;

Figure 8 discloses the locking nut structure of Figure 7 in operative clamped association with a screw element and work surface;

Figure 9 is a view similar to Figure 8 showing a slightly modified locking nut structure wherein the shell is counterbored to receive the shoulder of the threaded insert;

Figure 10 is a perspective view of the shell shown in Figure 9;

Figure 11 is a perspective view similar to Figures 1 and 7 disclosing a further modified nut structure wherein the shoulder against which the insert bears when the device is finally clamped in position is positioned along the inner periphery of the shell;

Figure 12 is a sectional view disclosing the locking nut structure of Figure 11 tightened against a work surface; and Figure 13 is a fragmentary plan view of a shell provided with an internal roughened or serrated surface.

Referring now to the drawings more in detail wherein like numerals have been employed to designate similar parts throughout the various figures, it will be seen that the invention contemplates a novel two-part lock nut as shown in Figures 1 to 5, inclusive. This lock nut structure is designated generally by the numeral 20 and includes an outer nut or shell section 22 and a companion insert 24. The shell 22 is provided with suitable flat peripheral surfaces 26 adapted to be engaged by a turning tool such as a wrench and is provided with a central aperture or bore 28.

The insert 24 is provided with internal threads 30 adapted for application to a conventional screw or bolt shank such as the screw 32 of Figures 3 and 4. The insert 24 is split at 34 to enable the internal threads 30 to be forced into engagement with the complementary thread convolutions on the screw 32, as will later appear. The section of the insert 24 designated by the bracket A has a roughened or serrated peripheral surface, said surface, in the disclosed embodiment, presenting a circumferentially disposed series of longitudinal serrations or teeth 36. These teeth are preferably harder than the internal surface of the shell and in instances where desired the insert may be subjected to a hardening process such as case hardening. The normal diameter of the insert section A before said insert is forced into the bore 28 of the shell 22 is slightly greater than the diameter of said bore. Thus, when the insert is initially driven into the bore 28 so as to occupy the position shown in Figures 2 and 3, the teeth or corrugations 36 firmly engage the inner peripheral surface defining the bore 28 and thus prevent inadvertent separation of the preassembled parts. That is to say, the frictional contact established between section A of the insert and the complementary internal periphery of the shell 22 is sufficient to permit the nut structure 20 to be handled as a single unit, and may therefore be shipped by the manufacturer to the place of application as a single unit.

A second serrated or corrugated portion of the insert 24 is designated by the letter B. This section B is shorter in axial extent than the section A and is provided with a plurality of serrations or corrugations 38. The external diameter taken across these serrations or corrugations 38 is slightly larger than the external diameter of the section A. Immediately adjacent the section B is a flange or shoulder section 40 extending radially outward from one extremity of the serrations of the section B.

When the insert 24 is initially assembled with the shell 22, as previously described, it is only partially inserted within the bore 28. That is to say, the insert 24 is forced into the bore 28 until said insert engages a shoulder 42. The diameter of the inner periphery defined by this shoulder 42 is less than the external diameter of the insert section A. When the insert is brought into engagement with the shoulder 42 the serrations or teeth 38 of the insert section B are in readiness to be driven into the periphery of the bore 28.

When the two constituent elements of the nut structure 20 occupy the position shown in Figure 2, the serrations 36 coact with the inner periphery of the shell 22 to secure the parts together as a preassembled unit and the internal diameter of the insert 24 is such as to permit free spinning of the unit upon the thread convolutions of the screw 32. The unit 20 spins freely upon the screw until the clamping side of the shell 22 engages the complementary surface of the work 44, Figure 3.

The grip of the serrations 36 within the surface area defining the bore 28 is not only sufficient to enable the nut structure to be handled as a unit as previously explained, but is also sufficient to cause the shell and the insert to rotate together as a unit after the shell has been carried into clamping engagement with the work 44. In certain instances the serrations on one part, namely, the insert, may be sufficient whereas in other applications it may be necessary to also serrate the internal surface or bore of the outer shell to insure positive rotation of the insert and shell as a unit. That is to say, continued rotation of the shell after it has reached the position shown in Figure 3 causes rotation therewith of the insert 24. Inasmuch as the shell cannot experience any further axial movement after it has reached the clamping position shown in Figure 3, continued rotation of said shell results in drawing the insert downwardly within the shell until the parts finally occupy the position shown in Figure 4. During this relative axial movement of the insert within the shell, the serrations 36 are driven into the smaller diameter defined by the shoulder 42 and the serrations 38 are driven into the smaller diameter presented by the bore 28. This causes the insert to experience the tendency to collapse and thereby increase the frictional engagement of the thread convolutions in the insert with the thread convolutions on the screw. When the shoulder or flange 40 is finally moved into firm clamping association with the complementary end surface of the shell 22, as illustrated in Figure 4, the thread convolutions of the insert will firmly impinge the complementary thread convolutions of the screw, and the nut structure 20 will be firmly secured against retrograde movement with respect to the screw 32.

To loosen the nut structure it is only necessary to exert a slight retrograde movement thereto and then apply a blow in an axial direction to the upper surface of the shell 22. This serves to axially separate the serrations 38 from the bore 28 and the serrations 36 from the shoulder portion 42. This enables the insert to expand to its normal larger diameter and the frictional bind between the thread convolutions of the insert and the screw is released so that the insert and shell may be freely spun in a retrograde or loosening direction.

In the locking nut structure just described the section A of the insert is substantially uniform in diameter over its entire axial extent. In instances where it is desired to facilitate the initial association of the insert and shell, I provide the insert with a section A' (see Figure 6) which decreases in external diameter toward the entering end. By tapering the entering end of the insert the ease with which it may be initially inserted within the bore 28 is obviously facilitated. I have found it preferable in instances where a tapered extremity is desirable to have said extremity taper very gradually. I am thus able to counteract the tendency of inadvertent axial separation which might result if the taper were too abrupt.

In Figure 8 I have disclosed a slightly modified locking nut structure designated generally by the numeral 20a. The only structural difference of the unit 20a from the unit 20 previously described is that the shell 22a is provided with a bore 28a which is uniform in diameter throughout its axial extent. The shell 22 previously described is provided with a shoulder 42 whereas in the shell 22a the shoulder has been omitted. In all other respects, however, the unit 20a is the same as the unit 20 and hence identical designating numerals have been employed to like parts. In the locking unit or nut structure 20 the presence of the shoulder 42 enables the portion of the insert 24 in the vicinity of the section A to be forced into tight gripping engagement with the screw threads as final rotation is imparted to the shell 22. In the locking unit 20a, however, all of the forces tending to spring the thread convolutions of the insert into impingement with the complementary thread convolutions on the screw 32 are caused solely by the engagement of the serrations 38 of the insert section B with the companion section of the bore 28a. That is to say, the corrugated or serrated section A of the insert 24, when used with the shell 22a, is employed solely to secure the insert and shell together as a unit prior to the assembly thereof with the screw and to provide a driving coupling between the shell and insert.

In Figures 9 and 10 a still further modified locking unit or nut structure 20b is shown. The only structural difference in the unit 20b from the unit 20a is in the provision of a shell designated by the numeral 22b having a bore 28b which is counterbored at 46 to receive the flange 40 of the insert 24. Thus, when the preassembled parts are finally clamped in position, the flange 40 will be seated within the counterbore 46 so that the end surface of the insert in the vicinity of the flange 40 will be flush with the adjacent end surface of the shell 22b.

In Figures 11 and 12 I have disclosed a still further modified form of unit or nut structure which is designated generally by the numeral 20c. Unit 20c includes a shell 22c and an insert 24c. The insert 24c corresponds structurally with the insert 24 except that the flange is omitted. Instead of employing the flange 40 on the insert, the shell 22c is provided with a shoulder 40c. This shoulder 40c differs from the previously described shoulder 42 of Figures 1 to 5, inclusive, in that it provides an abutment against which the extremity of the insert 24c may be forced, as shown in Figure 12. By employing the shoulder 40c the upper extremity of the insert 24c is flush with the upper extremity of the shell 22c when the parts have been finally clamped in position, as shown in Figure 12.

In Figure 13 I have shown fragmentarily a shell structure designated generally by the numeral 22e. This differs from the shells previously described in that the inner periphery 28e is roughened or serrated. In some instances it may be desirable to provide the roughened surfaces along the internal periphery of the shell as shown in Figure 13. This is particularly true in instances where the nut locking structure is to be employed on relatively small screws. In such instances it may be desirable to provide the serrations along the inner periphery of the shell. In fact, serrations or roughened surfaces may be provided along both the external periphery of the insert and the internal periphery of the shell. When so used, it may be desirable to employ a lesser number of serrations along the surface into which the serrations of the other member are to be embedded. As previously pointed out, the invention contemplates employing harder serrations on one member than on the other so as to insure positive interlocking between the contacting peripheral surfaces when the parts are moved axially with respect to each other. Thus, if the harder element is to be constructed of steel it may be preferable to case harden the device so as to render it harder than the other part. Also, if the parts are to be constructed of aluminum I find it preferable to use a harder aluminum for the element carrying the serrations which are to be driven into locking engagement with the periphery of the other element or part.

The serrations or striations carried by the insert or collet hereinbefore described serve as surface indenting or embedding elements. Obviously, as the insert is driven into the smaller aperture or bore of the shell, the serrations or teeth of the insert tend to embed themselves within the internal surface of the shell. This indenting or swaging action establishes a firm frictional grip between the outer periphery of the insert and the inner periphery of the shell as and for the purpose set forth above. The final axial movement of the threaded insert takes place as an incident to the unitary rotation of the shell and insert after the shell has clampingly engaged the work surface, and the resultant swaging interlock between the insert and shell causes the thread of the resilient insert to be urged against the complementary thread of the screw member.

From the foregoing it will be apparent that the present invention contemplates a self-locking nut device which is of extremely practical form and which may be produced by the practice of conventional machine shop methods. It will also be apparent that although my improved nut structure is composed of two elements, to-wit, a shell and an insert or collet, these parts may be transported and applied as a single unit. In other words, it is not necessary, at the point of installation, to first apply one member to the screw element and subsequently apply a second element. Also, a device constructed in accordance with the teachings of the present invention may be applied to a screw with the same degree of ease as a conventional nut because during the initial application of the nut to the screw it may be freely spun upon the screw threads.

The present invention also provides a locking nut structure which although composed of two assembled elements is pleasing in external appearance and, in fact, has the external appearance closely approximating that of a standard nut. By employing the corrugated or striated arrangement described above, a very simple yet effective expedient is presented for securing the shell and collet in preassembled relation prior to application to the work and for effectively coupling said parts as a rotatable unit. The corrugations or striations hereinbefore described make it possible to materially increase the tolerance limits for the external diameter of the insert and the internal diameter of the shell. The fact that these striations or teeth are designed to exert a swaging action makes it possible to use a considerably oversized insert in a shell insert of normal diameter or to use an insert of normal external diameter in a shell having an internal aperture which is considerably undersized. In instances where no teeth or swaging elements of any kind are employed, the parts would of necessity be held to much closer tolerances.

It is a well known that a rather wide limit of tolerances is permitted in the manufacture of screws. Hence some nuts may be easily spun on to a screw and others will fit tightly. By employing the knurled or striated surfaces illustrated herein, it permits a given size of insert and shell to be employed with the required degree of locking effectiveness on screws which come within the aforesaid range of tolerances. This should be distinguished from an arrangement wherein a plain or smooth cylindrical surface is forced into a plain internal periphery. Under such circumstances should the screw be slightly oversized the insert would immediately become locked upon the screw thread and further axial movement of the insert within the shell would be prevented. By the use of the knurled or serrated surfaces, as described herein, should the screw be slightly oversized these serrations or teeth will simply embed themselves or swage their way to a greater degree against the internal surface of the shell and thus permit the insert to be moved axially with respect to the shell after the clamping surface of the shell engages the work. Also in instances where one or both of the complementary engaging surfaces of the insert and shell are slightly tapered, the provision of serrations presents a practical advantage. It is very important that the insert and shell finally be brought into abutting relation and by using the knurled or serrated surfaces, complete movement of the insert into abutting engagement with the structure of the shell is always assured.

It will also be apparent that the present invention is not limited to the use of a knurled or striated surface on the insert, but contemplates using such surface configurations on either the insert or the inner periphery of the shell. From a practical standpoint it appears preferable to knurl or serrate the periphery of the insert but as previously pointed out in some instances it may be of advantage to knurl, serrate or roughen the inner peripheral surface of the shell.

It is important to note that the knurls or striations, being of a type adapted to dig into the opposed surface against which they are driven, should be such as to prevent the development of excessive pressure against the screw thread. This is accomplished by employing materials of different hardness in the insert and shell. By this arrangement it always enables the serrations to properly embed themselves within the softer material of the companion part and hence positive locking engagement between the nut structure and screw is avoided. This locking association of the nut structure and screw must be sufficient to prevent inadvertent loosening of the parts but must not be so effective as to prevent the turning of the nut relative to the screw by the application of a wrench or other similar turning tool.

Obviously, changes may be made in the specific structural details disclosed herein without departing from the spirit and scope of the oppended claims.

The invention is hereby claimed as follows:

1. A locking nut structure including a work clamping shell member having an external periphery adapted to be gripped for turning and having a central insert receiving aperture, a yieldable insert member adapted to be telescopically received within said aperture and to rotate as a unit with said shell, said insert member having an internal thread for accommodating a screw member, and a plurality of peripheral swaging elements on at least one of the aforesaid members adapted to cause an interlock between the periphery of said insert and the surface defining said aperture as an incident to the unitary rotation of said shell and insert after said shell has clampingly engaged a work surface, whereby to lockingly urge the thread of the insert against the complementary thread of a screw member.

2. A locking nut structure including a work clamping shell member having an external periphery adapted to be gripped for turning and having a central insert receiving aperture, a yieldable insert member adapted to be telescopically received within said aperture and to rotate as a unit with said shell, said insert member having an internal thread for accommodating a screw member, and a plurality of axially extending peripheral swaging elements on at least one of the aforesaid members adapted to cause an interlock between the periphery of said insert and the surface defining said aperture as an incident to the unitary rotation of said shell and insert after said shell has clampingly engaged a work surface, whereby to lockingly urge the thread of the insert against the complementary thread of a screw member.

3. A locking nut structure including a work clamping shell member having an external periphery adapted to be gripped for turning and having a central insert receiving aperture, a yieldable insert member adapted to be telescopically received within said aperture and to rotate as a unit with said shell, said insert member having an internal thread for accommodating a screw member, a plurality of peripheral swaging elements on at least one of the aforesaid members adapted to cause an interlock between the periphery of said insert and the surface defining said aperture as an incident to the unitary rotation of said shell and insert after said shell has clampingly engaged a work surface, whereby to lockingly urge the thread of the insert against the complementary thread of a screw member, and means for swagingly securing the insert and shell member against axial separation prior to the application of the insert to a screw member.

4. A locking nut structure including a work clamping shell member having an external periphery adapted to be gripped for turning and having a central insert receiving aperture, a yieldable insert member adapted to be telescopically received within said aperture and to rotate as a unit with said shell, said insert member having an internal thread for accommodating a screw member, and a plurality of peripheral swaging elements on at least one of the aforesaid members adapted to cause an interlock between the periphery of said insert and the surface defining said aperture as an incident to the unitary rotation of said shell and insert after said shell has clampingly engaged a work surface, whereby to lockingly urge the thread of the insert against the complementary thread of a screw member, the outer periphery of the insert and the complementary inner periphery of the shell closely approximating parallelism in the direction of their axes.

5. A locking nut structure including a work clamping shell member having an external periphery adapted to be gripped for turning and having a central insert receiving aperture, a yieldable insert member adapted to be telescopically received within said aperture and to rotate as a unit with said shell, said insert member having an internal thread for accommodating a screw member, and a plurality of peripheral striations on at least one of the aforesaid members adapted to cause a swaged interlock between the periphery of said insert and the surface defining said aperture as an incident to the unitary rotation of said shell and insert after said shell has clampingly engaged a work surface, whereby to lockingly urge the thread of the insert against the complementary thread of a screw member.

6. A locking nut structure including a work clamping shell member having an external periphery adapted to be gripped for turning and having a central insert receiving aperture, a yieldable insert member adapted to be telescopically received within said aperture and to rotate as a unit with said shell, said insert member having an internal thread for accommodating a screw member, a plurality of peripheral swaging elements on at least one of the aforesaid members adapted to cause an interlock between the periphery of said insert and the surface defining said aperture as an incident to the unitary rotation of said shell and insert after said shell has clampingly engaged a work surface, whereby to lockingly urge the thread of the insert against the complementary thread of a screw member, and abutment means for positively limiting the extent of axial movement of said insert into said shell.

7. A locking nut structure including a work clamping shell member having an external periphery adapted to be gripped for turning and having a central insert receiving aperture, a yieldable insert member adapted to be telescopically received within said aperture and to rotate as a unit with said shell, said insert member having an internal thread for accommodating a screw member, a plurality of peripheral swaging elements on at least one of the aforesaid members adapted to cause an interlock between the periphery of said insert and the surface defining said aperture as an incident to the unitary rotation of said shell and insert after said shell has clampingly engaged a work surface, whereby to lockingly urge the thread of the insert against the complementary thread of a screw member, and annularly disposed abutment means on the insert adapted to engage one extremity of the shell so as to limit the extent to which the insert may be moved into said shell.

8. A locking nut structure including a work clamping shell member having an external periphery adapted to be gripped for turning and having a central insert receiving aperture, a yieldable insert member adapted to be telescopically received within said aperture and to rotate as a unit with said shell, said insert member having an internal thread for accommodating a screw member, a plurality of peripheral swaging elements on at least one of the aforesaid members adapted to cause an interlock between the periphery of said insert and the surface defining said aperture as an incident to the unitary rotation of said shell and insert after said shell has clampingly engaged a work surface, whereby to lockingly urge the thread of the insert against the complementary thread of a screw member, and annularly disposed abutment means associated with the internal periphery of said shell and adapted to be engaged by the inner extremity of the insert so as to limit the degree of axial movement of said insert within the shell.

9. A locking nut structure including a work clamping shell member having an external periphery adapted to be gripped for turning and having a central insert receiving aperture, a yieldable collet type insert member adapted to be telescopically received within said aperture, said insert member having an internal thread for accommodating a screw member and an external peripheral surface adapted to cooperate with the internal periphery of the shell to cause the thread on the insert to be urged against the complementary thread of the screw member in response to unitary rotation of the shell and insert after the shell has clampingly engaged a work surface, and swaging means associated with the complementary telescopic surfaces of said members for swagingly retaining said members in preassembled relation prior to the application thereof to a screw member.

10. A locking nut structure including a work clamping shell member having an external periphery adapted to be gripped for turning and having a central insert receiving aperture, a yieldable collet type insert member adapted to be telescopically received within said aperture, said insert member having an internal thread for accommodating a screw member and an external peripheral surface adapted to cooperate with the internal periphery of the shell to cause the thread on the insert to be urged against the complementary thread of the screw member in response to unitary rotation of the shell and insert after the shell has clampingly engaged a work surface, and swaging means including a peripheral area of the insert adapted for a swaged driving fit within said shell for securing said insert and shell against inadvertent axial separation prior to the application of the insert to a screw member.

11. A locking nut structure including a work clamping shell member having an external periphery adapted to be gripped for turning and having a central insert receiving aperture, a yieldable collet type insert member adapted to be telescopically received within said aperture, said insert member having an internal thread for accommodating a screw member and an external peripheral surface adapted to cooperate with the internal periphery of the shell to cause the thread on the insert to be urged against the complementary thread of the screw member in response to unitary rotation of the shell and insert after the shell has clampingly engaged a work surface, and means associated with the complementary telescopic surfaces of said members for frictionally retaining said members in preassembled relation prior to the application thereof to a screw member, including a plurality of swaging striations cooperatively arranged with respect to that portion of the external periphery of the insert which is initially inserted within the shell for swagingly securing said insert and shell against inadvertent axial separation prior to the application of the insert to a screw member.

12. A locking nut structure including a work clamping shell member having an external periphery adapted to be gripped for turning and having a central insert receiving aperture, a yieldable collet type insert member adapted to be telescopically received within said aperture, said insert member having an internal thread for accommodating a screw member and an external peripheral surface adapted to cooperate with the internal periphery of the shell to cause the thread on the insert to be urged against the complementary thread of the screw member in response to unitary rotation of the shell and insert after the shell has clampingly engaged a work surface, and means including a plurality of swaging elements associated with the external periphery of the insert and engaging the internal periphery of the shell for coupling the insert and shell as a unit.

13. A locking nut structure including a work clamping shell member having an external periphery adapted to be gripped for turning and having a central insert receiving aperture, a yieldable collet type insert member adapted to be telescopically received within said aperture, said insert member having an internal thread for accommodating a screw member, said insert member and shell having cooperative contacting peripheral surface portions to cause the thread on the insert to be urged against the complementary thread of a screw member in response to rotary rotation of the shell and insert after the shell has clampingly engaged a work surface, and swaging elements associated with at least one of said cooperative contacting surface portions to facilitate swaged engagement with the other surface portion.

14. A locking nut structure including a work clamping shell member having an external periphery adapted to be gripped for turning and having a central insert receiving aperture, a yieldable collet type insert member adapted to be telescopically received within said aperture, said insert member having an internal thread for accommodating a screw member, said insert member and shell having cooperative contacting peripheral surface portions, at least one of which is tapered, to cause the thread on the insert to be urged against the complementary thread of a screw member in response to rotary rotation of the shell and insert after the shell has clampingly engaged a work surface, and swaging elements associated with at least one of said cooperative contacting surface portions to facilitate swaged engagement with the other surface portion.

EDMOND C. CROWTHER.